Figure 1:
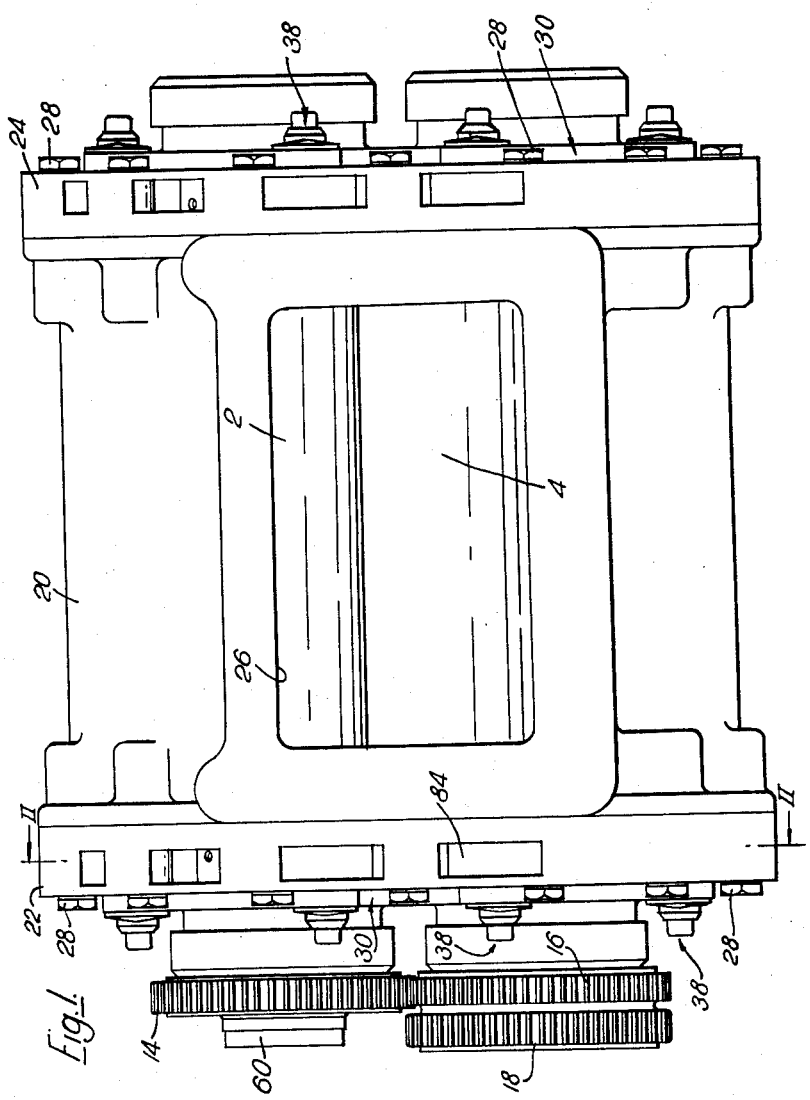

Dec. 3, 1963     K. L. F. ROBERTS     3,112,867
BLOWERS AND MOTORS WITH COOPERATING ROTORS
Filed March 26, 1962     4 Sheets-Sheet 1

Inventor
Kenneth Leonard Francis Roberts

By
Bailey, Stephens & Huettig
Attorneys

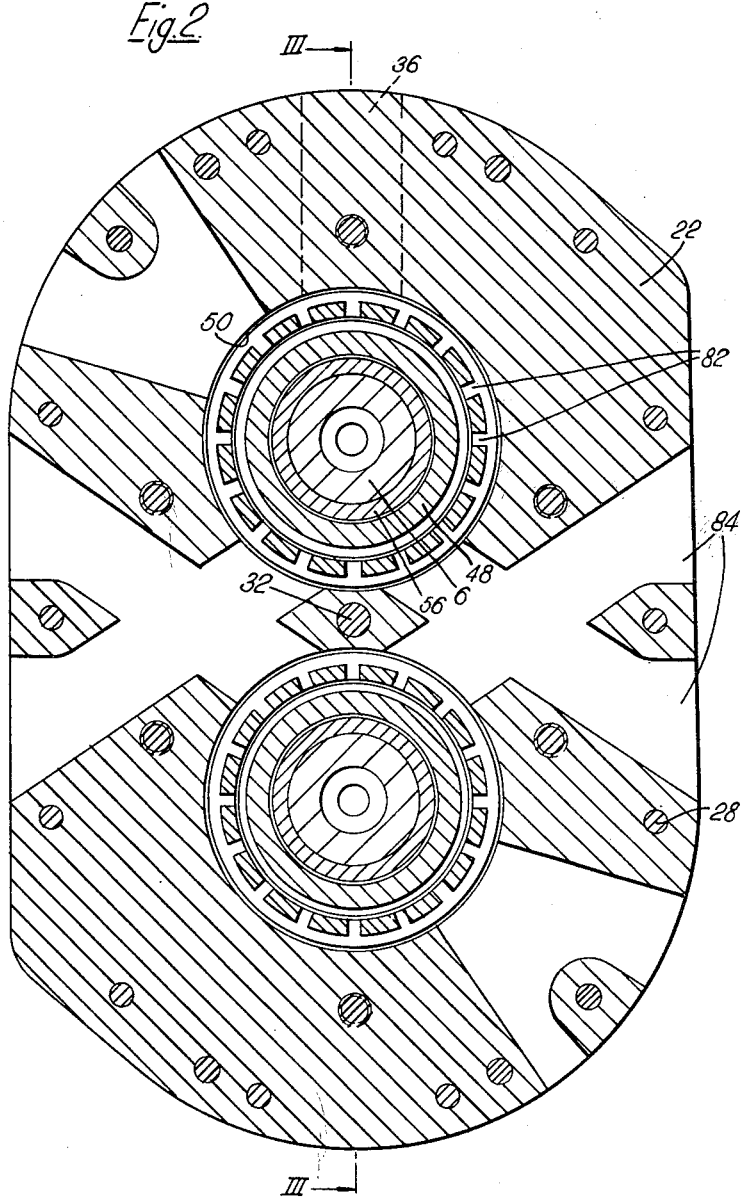

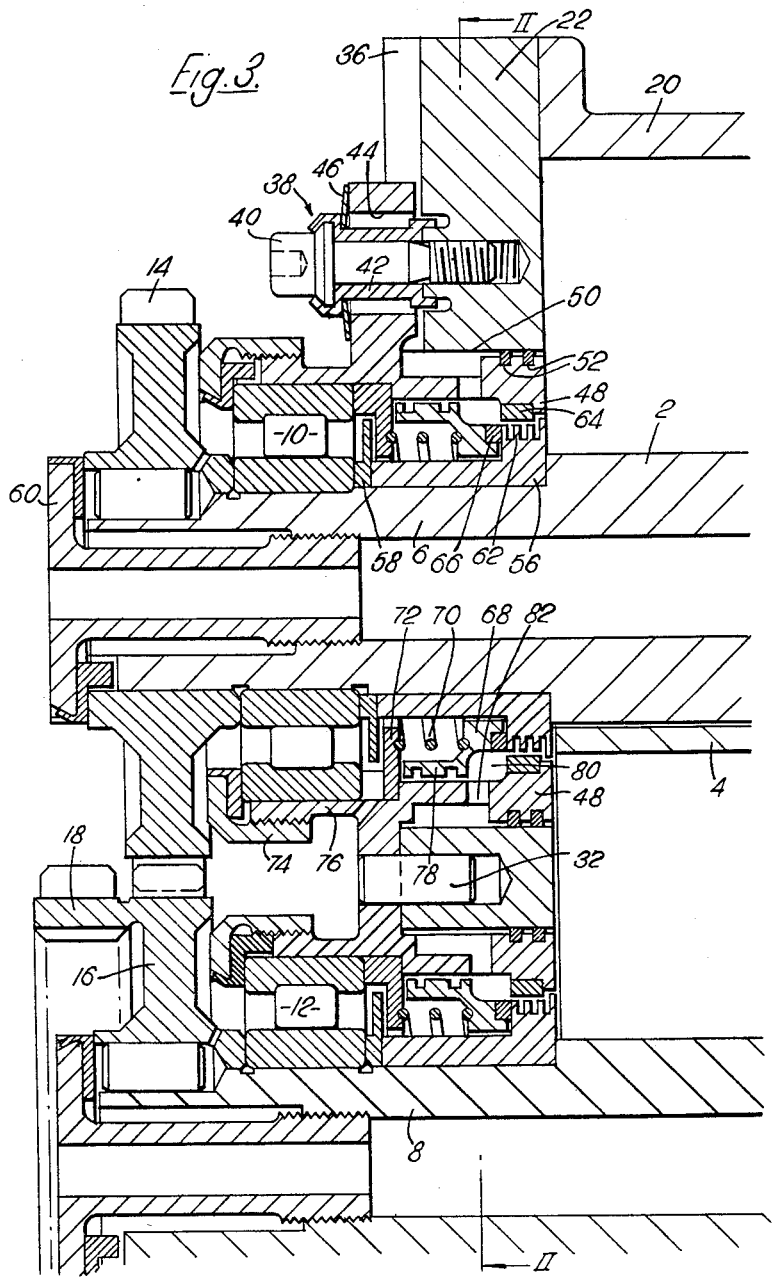

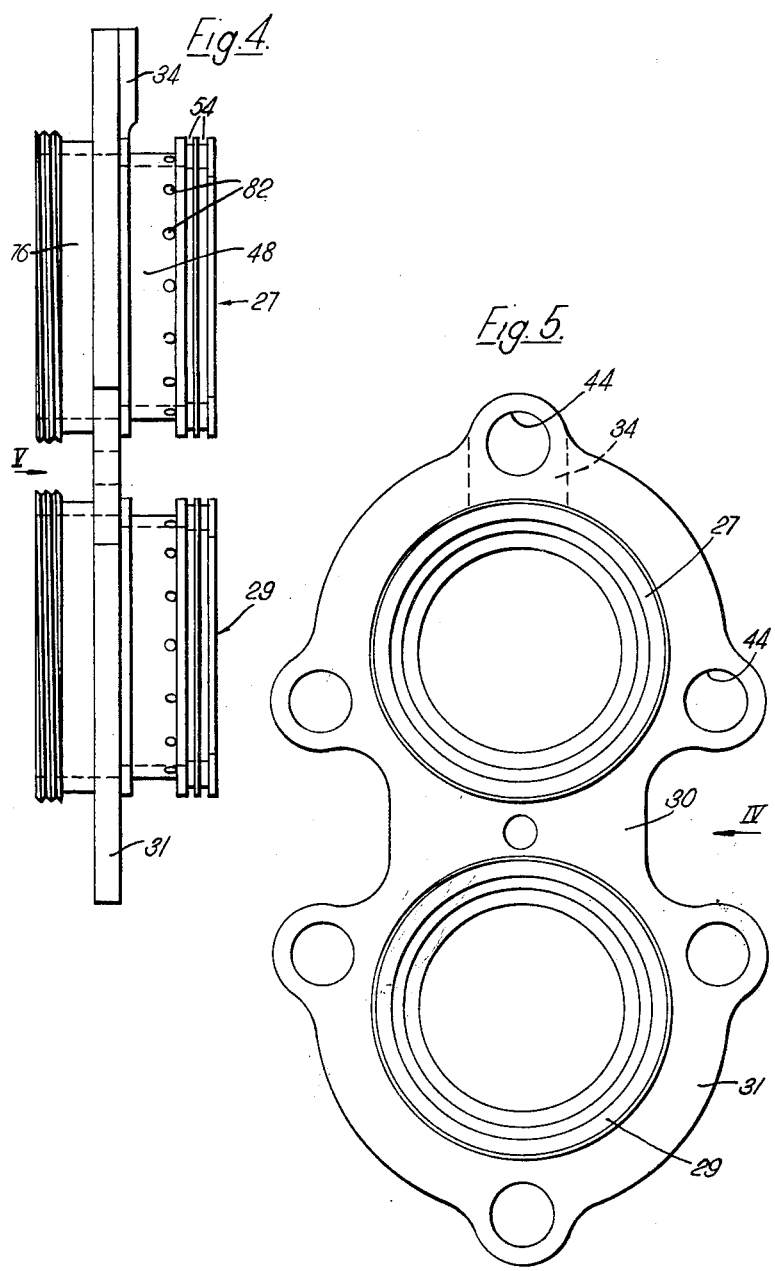

United States Patent Office 3,112,867
Patented Dec. 3, 1963

3,112,867
BLOWERS AND MOTORS WITH
COOPERATING ROTORS
Kenneth Leonard Francis Roberts, Eastbourne, Sussex, England, assignor to Wade Engineering Limited, Sussex, England, a British company
Filed Mar. 26, 1962, Ser. No. 182,223
Claims priority, application Great Britain Mar. 29, 1961
3 Claims. (Cl. 230—141)

There are various kinds of machine, of which Root's blowers are one common kind, in which two cooperating rotors turn on parallel shafts in a casing, the shafts being geared together outside the casing.

According to the present invention the shafts are journalled in bearings mounted in housings which are components distinct from end walls of the casing, each bearing housing being fixed at one point to the end wall, and also constrained against rotation relative to the end wall, but being free to expand and contract linearly relatively to the end wall.

This construction enables the casing to be of a metal chosen with an eye to ease of manufacture and to lightness, for example a light alloy, while the bearing housings may be of metal such that the close meshing of the gears, on which depends the maintenance of the correct phase relationship between the rotors, is not impaired by changes of temperature such as occur when the load on a blower or motor is varied, or such as may be due to changes in ambient temperature.

What happens is that the gears themselves are subject to thermal expansion or contraction, while at the same time thermal expansion or contraction of the bearing housings causes the axes of the shafts to separate or approach to a corresponding extent, so that the closeness of mesh of the gears is substantially unaltered. At the same time the end walls may expand or contract to a considerably greater extent than the bearing housings, with no effect on the meshing of the gears, such as does occur if the bearings are mounted directly in the end walls of a casing of light alloy.

In addition, or alternatively, the rotors may be of metal such that the radial clearances between the rotors are substantially unaltered upon thermal expansion or contraction of the bearing housings.

There must be clearance for the shafts in the openings through which they emerge from the casing, and if there are one or more seals at this point, then one of them must permit some relative movement of the shafts across the openings.

The invention is applicable not only to machines with only two shafts, but also to machines with three or more parallel shafts, each with a rotor.

The accompanying drawings show one example of a Root's blower constructed in accordance with the invention. In these drawings:

FIGURE 1 is a side elevation of the blower;
FIGURE 2 is a section, somewhat enlarged, on the line II—II in FIGURE 1. (This line being also shown in FIGURE 3);
FIGURE 3 is a fragmentary section enlarged, on the line III—III in FIGURE 2;
FIGURE 4 is a side elevation of the bearing housing at the left hand end of the blower, seen from the direction of the arrow IV in FIGURE 5; and
FIGURE 5 is an end elevation of the bearing housing, seen in the direction of the arrow V in FIGURE 4.

The blower has two cooperating two-lobed rotors 2 and 4. The precise construction of the rotors is of no consequence to the present invention, and they are shown as having integral stub shafts 6 and 8 at each end (FIGURE 3) which are journalled in bearings 10 and 12.

There are bearings at each end of each rotor, those at the left hand end being roller bearings, and those at the right hand end (not shown) being ball bearings. At the left hand end the stub shafts 6 and 8 are prolonged and carry gears 14 and 16 which mesh together, and in addition the shaft 8 carries a gear 18 by which the blower may be driven.

The rotors are enclosed in a main housing consisting of a body 20 and end walls 22 and 24. These end walls are identical. There are inlet and exhaust ports in the body 20, the exhaust port 26 being visible in FIGURE 1. The end walls 22 and 24 are fixed to the body by bolts 28. The end walls and the body are all of aluminum alloy.

The bearings 10 and 12 are mounted in bearing housings. The housings at each end of the blower are identical, and the left hand one 30 will be described in detail. Essentially, as shown in FIGURES 4 and 5, the bearing housing is in the form of two sleeves 27, 29, one for each bearing, the sleeves being integral with a plate 31 which is fastened against the end wall. The plate is located relative to the end wall 22 by a dowel pin 32. The pin may be replaced by a bolt in a close-fitting hole. In addition, the plate is restrained from rotation by having an integral key 34 at the top, which cooperates with a groove 36 in the face of the end wall. The plate is held against the end wall by six fastening devices 38 which serve to press the plate against the end wall, but do not restrain movement of the plate in a plane parallel to the end wall due to differential thermal expansion of the plate and the end wall. As shown in FIGURE 3, each fastening device 38 consists of a stud 40 surrounded by a collar 42 which passes with clearance through an opening 44 in the plate. The stud is screwed into the end wall 22 until the collar 42 prevents further movement. A conical spring washer 46 is thus compressed between the plate and a shoulder on the collar 42, and by this means a substantial predetermined pressure is exerted on the plate 31.

Alternatively the bearing housing may be held against the end walls by resilient clamps.

The materials of the bearing housing 30 and of the gears 14 and 16 are chosen so that, upon changes of temperature, the resultant linear expansion of the gears and of the bearing housing will be the same, so that the mesh of the gears will be unaffected.

The right hand parts 48 of the sleeves of the bearing housing enter openings 50 in the end wall 22, substantial clearance being provided. This clearance is sealed by piston rings 52 in grooves 54 in the sleeve part 48. This seal is undisturbed by relative radial motion of the sleeves and the end wall.

A rotary seal between the sleeve parts 48 and the shafts 6 and 8 is obtained as follows, reference being made particularly to the left hand end of the shaft 6, as shown in FIGURE 3. The following components, in sequence from right to left, are fitted over the shaft 6: a sleeve 56, an oil-slinging ring 58, the inner race of the bearing 10 and the gear 14. These are all held in place by a cap screw 60. On the outside of the right hand end of the sleeve 56 are a number of circumferential ribs 62, which turn with slight clearance within a carbon ring 64 press-fitted within the sleeve part 48. For the sake of clarity in distinguishing the parts, this clearance between the ribs and the carbon ring is exaggerated in FIGURE 3. In addition, to prevent any possibility of oil reaching the blower, there is a further seal between a second carbon ring 66 and a shoulder on the sleeve 56. This carbon ring 66 is carried by a sealing ring 68 which is urged to the right by a compression spring 70. This compression spring is confined against a disc 72, the disc and the outer race of the bearing 10 being held against a shoulder by a cap 74 threaded on to the left hand part 76 of the sleeve of the bearing housing. The spring 70 resists rotation of the sealing ring and may be assisted by a key, not shown.

A grooved part 78 of the sealing ring 68 is a sliding fit within a bore in the sleeve part 48 of the bearing housing. There may be resilient O-rings, not shown, in the grooves. A space 80 is vented to atmosphere through holes 82 in the sleeve part 48. These holes communicate with various passages 84 formed in the thickness of the end wall 22, as shown in FIGURE 2.

Bearing housings as shown in this example may also be used in a Root's type air motors.

I claim:

1. A machine comprising a main housing including two end walls, a bearing housing mounted externally directly on each of the end walls, two bearings in each bearing housing, two parallel shafts extending from end to end of the housing and journalled at each end in one of the bearings, two cooperating lobed rotors, one on each of the shafts, forming small but finite running clearances with one another and with the main housing, two gears in mesh, one on each shaft, immediately external to one of the bearing housings, means locating each bearing housing relatively to the adjacent one of the end walls, said locating means restraining relative movement between the bearing housing and the end wall in a plane perpendicular to the shaft axes at a point substantially mid way between the shafts and relative rotary movement between the bearing housing and the end wall while permitting local relative linear movement between the bearing housing and the end wall elsewhere in the plane, consequent on relative different thermal expansions of the end wall and bearing housing, the bearing housings being of a material which has a coefficient of thermal expansion substantially less than that of the main housing and which in operation expands thermally to substantially the same extent as the gears.

2. A machine according to claim 1 in which the end walls define clearance openings for the shafts, and there is in each clearance opening sealing means which blocks flow of fluid along the respective shaft while permitting movement of the shaft across the opening.

3. A machine according to claim 1 in which there are fastenings, including resilient washers, holding each bearing housing in place against the adjacent end wall.

References Cited in the file of this patent

UNITED STATES PATENTS

| | | |
|---|---|---|
| 1,304,993 | Leonard | May 27, 1919 |
| 2,294,805 | Robinson | Sept. 1, 1942 |
| 2,504,230 | Smith | Apr. 18, 1950 |
| 2,837,031 | Hune | June 3, 1958 |
| 2,842,066 | Hilton | July 8, 1958 |
| 2,850,985 | Kammerer | Sept. 9, 1958 |
| 2,864,315 | Udale | Dec. 16, 1958 |
| 2,932,254 | Booth et al. | Apr. 12, 1960 |
| 2,967,487 | Nagely | Jan. 10, 1961 |
| 2,969,744 | Hoffer | Jan. 31, 1961 |